United States Patent [19]

Inoue et al.

[11] Patent Number: 4,698,395

[45] Date of Patent: Oct. 6, 1987

[54] PROCESS OF PURIFYING MALEIC ANHYDRIDE-MODIFIED POLYOLEFIN

[75] Inventors: Takayuki Inoue; Masafumi Hattori; Kazuhide Hayama; Riichiro Maruta, all of Mie, Japan

[73] Assignee: Mitsubishi Petrochemical Co., Ltd., Tokyo, Japan

[21] Appl. No.: 863,191

[22] Filed: May 14, 1986

[30] Foreign Application Priority Data

May 20, 1985 [JP] Japan ................................ 60-107276

[51] Int. Cl.$^4$ ............................ C08F 8/42; C08F 8/44
[52] U.S. Cl. ................................. 525/327.8; 523/337; 525/285; 525/369; 528/489; 528/491; 528/499
[58] Field of Search ...................... 528/489, 491, 499; 525/285, 327.8, 369; 523/339

[56] References Cited

U.S. PATENT DOCUMENTS 3,483,276 12/1969 Mahlman et al. ................... 260/897
4,064,315 12/1977 Bivans et al. ....................... 428/518
4,506,056 3/1985 Gaylord .............................. 525/285
4,599,385 7/1986 Clayton et al. ..................... 525/285

Primary Examiner—Wilbert J. Briggs, Sr.
Assistant Examiner—David W. Woodward
Attorney, Agent, or Firm—Oblon, Fisher, Spivak, McClelland, & Maier

[57] ABSTRACT

A process of purifying maleic anhydride graft polyolefin comprising the steps of adding an aqueous solution of alkali initial hydroxide to a solution of maleic anhydride graft polyolefin containing unreacted maleic anhydride which is dissolved in an organic solvent at a temperature from 80° C. to 160° C., thereby precipitating maleic anhydride graft polyolefin particles to make a W/O emulsion; stirring the W/O emulsion while maintaining the temperature at a same temperature as above for less than 2 hours, thereby selectively forming the alkali metal salt of unreacted maleic anhydride; adding the aqueous solution of alkali metal hydroxide to the W/O emulsion to convert the W/O emulsion into an O/W emulsion; separating the maleic anhydride draft polyolefin particles, and washing the maleic anhydride graft polyolefin particles with water.

9 Claims, No Drawings

PROCESS OF PURIFYING MALEIC ANHYDRIDE-MODIFIED POLYOLEFIN

FIELD OF THE INVENTION

The present invention relates to a process for the purification of maleic anhydride graft polyolefin which has a good adhesive property to metals or plastics such as polyamide, polyethylene terephthalate, saponified ethylene-vinyl acetate copolymer, polypropylene, etc.

Hollow vessels constituted by laminates made of maleic anhydride graft polyolefin obtained according to the present invention and polyamide, polyethylene terephthalate, or saponified ethylene-vinyl acetate copolymer are useful as vessels for fuel, soy sauce chemicals, etc., and bags constituted by films made of the above-mentioned laminates are useful as packing material for retort pouches.

A laminate of aluminum foil and polyolefin, obtained by using maleic anhydride graft polyolefin as an adhesive agent is useful as packing material for retort pouches.

BACKGROUND OF THE INVENTION

Two types of processes for the production of maleic anhydride graft polyolefin have been already known as follows:

(1) A solution polymerizing process comprising the steps of: dissolving a polyolefin, such as polyethylene, polypropylene, ethylene-vinyl acetate copolymer, ethylene-propylene copolymer, or the like, in an organic solvent, such as benzene, toluene, xylene, chlorobenzene, or the like, while being heated; and adding dropwise thereto an organic solvent containing maleic anhydride and an initiator, such as dicumyl peroxide, or the like, followed by stirring the solution, thereby making graft polymerization (Japanese Patent Publication Nos. 3254/77 and 15422/69); and (2) A melt polymerizing process comprising the steps of heating a mixture of the above-mentioned polyolefin, maleic anhydride, and an initiator, followed by mulling the melt by the use of an extruder, thereby making graft polymerization (Japanese Patent Publication No. 39675/81).

The maleic anhydride graft polyolefin obtained by these processes still contains unreacted maleic anhydride which consequently diminishes adhesion of the graft polymer to polyamide, metal, etc. In order to prevent the loss of adhesion, the following types of processes have been proposed:

(a) A process of removing unreacted maleic anhydride comprising the steps of cooling maleic anhydride graft polyolefin down to room temperature after graft polymerization, washing with acetone, and drying under reduced pressure (Japanese Patent Publication No. 32654/77);

(b) A process of removing unreacted maleic anhydride comprising extracting maleic anhydride from maleic anhydride graft polyolefin with acetone (Japanese Patent Publication No. 15422/69); and (c) A process of removing unreacted maleic anhydride comprising washing maleic anhydride graft polyolefin by blowing pressurized steam thereto.

Of these processes, the processes (a) and (b) using acetone are high in cost, since a part of the acetone (boiling point: 56.5° C.) used is not recovered. The process (c) is not satisfactory for removing unreacted maleic anhydride in the case where the particle size of the modified resin is large. In addition, the incidental equipment required for the process (c) is expensive.

SUMMARY OF THE INVENTION

Therefore, a first object of the present invention is to provide a process of purifying maleic anhydride graft polyolefin in which the disadvantages in the prior art are eliminated.

A second object of the present invention is to provide a process of purifying maleic anhydride graft polyolefin in which an organic solvent (liquid under the condition of ordinary temperature and atmospheric pressure) having no affinity for water can be used, thereby simplifying the recovery of the solvent.

A third object of the invention is to provide a process of purifying maleic anhydride graft polyolefin in which unreacted maleic anhydride can be changed into water-soluble maleic anhydride salt by using a solution of inexpensive alkali metal hydroxide in a specific concentration.

A fourth object of the invention is to provide a process of purifying maleic anhydride graft polyolefin in which grafted maleic anhydride groups in the modified polyolefin can be prevented from changing into alkali metal salt, thereby providing a good adhesive property.

The foregoing and other objects of the invention are attained by a process of purifying maleic anhydride graft polyolefin comprising the steps of: adding an aqueous solution of alkali metal hydroxide to a solution of maleic anhydride graft polyolefin containing unreacted maleic anhydride dissolved in an organic solvent at a temperature from 80° C. to 160° C., thereby precipitating maleic anhydride graft polyolefin particles to make a W/O emulsion; stirring the W/O emulsion while maintaining the temperature at the same temperature as above for less than 2 hours; adding the aqueous solution of alkali metal hydroxide to the W/O emulsion to change the W/O emulsion into an O/W emulsion; separating the maleic anhydride graft polyolefin particles; and washing the maleic anhydride graft polyolefin particles with water.

DETAILED DESCRIPTION OF THE INVENTION

A. Polyolefin

Examples of the polyolefin used in the present invention include homopolymers of olefins, such as ethylene, propylene, 1-butene, 1-hexene, 3-methyl-1-pentene, 4-methyl-1-pentene, etc., random or block copolymers of two or more of the olefins, random copolymers containing the olefins as main components and other compounds, such as vinyl acetate, acrylic acid, methacrylic acid, acrylic ester, etc., and the like.

Typical examples of the polyolefin include high-density polyethylene, low-density polyethylene, linear low density polyethylene, polypropylene, ethylene-propylene copolymer, ethylene-vinyl acetate copolymer, ethylene-butene-1 copolymer, propylene-butene-1 copolymer, ethylene-ethyl acrylate copolymer, ethylene-mathacrylic acid copolymer zinc salt, etc.

These compounds can be used in single or in combination.

B. Maleic Anhydride

Maleic anhydride is represented by the general formula:

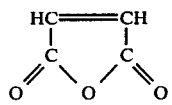

and has a melting point of about 52.8° C., and is soluble in acetone, benzene, chloroform, chlorobenzene, etc.

The maleic anhydride is generally used in the proportion from 0.05 to 40 parts by weight per 100 parts by weight of polyolefin, and subject to the above-mentioned (1) solution polymerization or (2) melt polymerization with the polyolefin, in the presence of an initiator.

As the initiator, organic peroxides such as cumene peroxide, t-butyl perbenzoate, benzoyl peroxide, etc., are used.

It is preferable to employ the (1) solution polymerization as a process of graft polymerization because of its inexpensiveness, since the solvent used for the polymerization can be used again as it is for the purification or the polymerization and purification can be made in the same reactor.

C. Maleic Anhydride Graft Polyolefin

Maleic anhydride graft polyolefin obtained by the general polymerization commonly has a unit concentration of maleic anhydride from 0.01 to 15% by weight (Japanese Patent Application (OPI) Nos. 16781/78 and 32078/77 (the term "OPI" as used herein refers to a "published unexamined Japanese patent application"). This modified polyolefin still contains unreacted maleic anhydride which inhibits the adhesive property thereof. Accordingly, it is necessary to remove the unreacted maleic anhydride.

D. Purification

Purification is performed by the steps of: adding an aqueous solution of alkali metal hydroxide of a concentration of from 0.4 to 1.8% by weight to a solution of maleic anhydride graft polyolefin containing unreacted maleic anhydride dissolved in an organic solvent at a temperature from 80° C. to 160° C., thereby precipitating maleic anhydride graft polyolefin particles to make a W/O emulsion; stirring the W/O emulsion while maintaining the temperature at the same temperature as above for less than 2 hours; adding the aqueous solution of alkali metal hydroxide to the W/O emulsion to change the W/O emulsion into an O/W emulsion; separating the maleic anhydride graft polyolefin particles; and washing the separated particles with water.

The organic solvent to be used must be a solvent having no affinity for water, and examples thereof include aromatic hydrocarbons having a boiling point of 80° C. or more, such as benzene, toluene, xylene, chlorobenzene, etc.; aliphatic hydrocarbons, such as hexane, heptane, isooctane, methylcyclohexane, decahydronaphthalene, etc.; halogenated hydrocarbons, such as trichloroethylene, chlorobenzene, dichlorobenzene, etc.; or the like and preferred example thereof is chlorobenzene.

The organic solvent is used in the proportion of from 100 to 2,500 parts by weight, preferably from 500 to 1,500 parts by weight, per 100 parts by weight of maleic anhydride graft polyolefin.

The alkali metal hydroxide to be used may be LiOH, KOH, NaOH, or the like. Of these materials, NaOH is preferable because it is inexpensive. In order to remove the unreacted maleic anhydride as alkali metal salt, preferably a high concentration of the alkali metal hydroxide in the aqueous solution of alkali metal hydroxide is employed. If it is too high, however, even the grafted maleic anhydride groups in the modified polyolefin may be partly changed into alkali metal salt. Accordingly, the concentration of the alkali metal hydroxide in the aqueous solution is preferably from 0.4 to 1.8% by weight.

The addition of the aqueous solution of the alkali metal hydroxide to the solution of modified polyolefin dissolved in the organic solvent is preferably performed at a solution temperature of 80° C. or more to facilitate the reaction between the maleic anhydride and the alkali metal hydroxide. However, if the reaction temperature is too high, a part of grafted maleic anhydride groups in the modified polyolefin may be changed into alkali metal salt. On the other hand; if the reaction temperature is less than 80° C., the grafted polyolefin rapidly begins to crystallize so as to destroy the emulsion state thereof so that the unreacted maleic anhydride is allowed to be contained in the graft polyolefin particles to thereby make it difficult to remove the unreacted maleic anhydride by washing. Accordingly, the reaction temperature preferably ranges from 80° C. to 160° C.

The alkali metal hydroxide is used in such amount that the hydroxide groups range from 0.35 to 1.6 equivalent weight per 1 equivalent weight of carboxyl groups on the basis of both of the maleic anhydride graft polyolefin and the unreacted maleic anhydride (in which non-open-circle acid groups are regarded as 2 equivalent weight of carboxyl groups).

Upon the addition of the aqueous solution of alkali metal hydroxide to the solution of modified polyolefin dissolved in the organic solvent, the mixture is stirred continuously at a temperature of from 80° to 160° C. for less than 2 hours, preferably at a temperature of from 90° to 140° C. for a period of time of from 10 minutes to 1.5 hours while the mixture is maintained in the W/O emulsion state to thereby mainly undergo neutralization of the unreacted maleic anhydride. At this time, a part of dissolved maleic anhydride graft polyolefin begins to precipitate, and a part of alkali metal salt of maleic anhydride begins to dissolve in a water phase. If the stirring is performed by the use of an agitator, for example, a line mixer, having high shearing power, the neutralization may be completed in 5 to 120 seconds.

The further addition of the aqueous solution of alkali metal hydroxide is made while stirring to change the phase into O/W emulsion, to thereby facilitate the dissolving of alkali metal salt of maleic anhydride into the water phase and the precipitation of maleic anhydride graft polyolefin particles.

Thereafter, the maleic anhydride graft polyolefin particles are separated by means of centrifugal separation or the like, and are then washed with water at a temperature of from 10° to 90° C. The washing is repeated and, if necessary, the particles are dried under reduced pressure or dried with centrifugal separation to thus obtained modified polyolefin particles free from a great part of or all of the unreacted maleic anhydride.

The concentration of the grafted maleic anhydride in the thus obtained maleic anhydride graft polyolefin particles ranges from 0.01 to 15% by weight, preferably from 0.1 to 10% by weight.

The maleic anhydride graft polyolefin is utilized as adhesive resin, as coating resin or as dispersing agent for inorganic fine powder and pigments, in single or in a state diluted with non-modified polyolefin or blended with thermoplastic resin such as rubber, polyamide, saponified ethylene-vinyl acetate copolymer, or the like.

EXAMPLE 1

In a reactor, 100 parts by weight of isotactic polypropylene having a melt flow rate of 25 g per 10 minutes and 600 parts by weight of chlorobenzene were filled in a vessel equipped with a cooler and heated up to 125° C. to dissolve the isotactic polypropylene, and 28 parts by weight of maleic anhydride was added thereto and dissolved together. After the dissolving, 105 parts by weight of a chlorobenzene-solution in which 5 parts by weight of dicumyl peroxide was dissolved was added dropwise to the resulting mixture while stirring the mixture at 125° C. for 5 hours, and then the mixture was kept at the same temperature for 1 hour to thus perform graft polymerization.

The polymerizing solution was cooled down to 100° C., and then 400 parts by weight of an aqueous solution of sodium hydroxide having the concentration shown in Table 1 at the same temperature was added to the polymerizing solution in 1/6 hours, while maintaining the temperature at the same temperature as above, to thereby obtain a W/O emulsion. After the completion of the addition, the temperature was further maintained at the same temperature as above for further 1 hour to precipitate polymer particles.

Next, 1,600 parts by weight of sodium hydroxide having the same concentration was added dropwise to the resulting mixture at 100° C. for half an hour. The temperature was maintained at the same temperature as above for further half an hour, and then the mixture was cooled down to the room temperature (20° C.).

Next, the thus precipitated polymer particles were centrifugally separated, washed with 2,000 parts by weight of water, and dried with centrifugal separation to obtain maleic anhydride graft propylene particles containing unreacted maleic anhydride in the amount shown in Table 1 and 5.1% by weight of grafted maleic anhydride.

A resin mixture of 78 parts of non-modified polypropylene (MI: 0.8; sp.gr.: 0.91), 20 parts of ethylenepropylene rubber (ethylene content: 75% by weight; Mooney viscosity: 70), and 2 parts of the thus obtained maleic anhydride graft polypropylene, was extruded in a state of strand at a temperature of 250° C. to make a pellet.

Press sheets each having a thickness of 0.5 mm were prepared by using the pellet and nylon 6 (tradename: Novamide 1040, Mitsubishi Chemical Industries, Ltd.). The two press sheets were press-welded to each other under the condition of 40 kg/cm² and 230° C. by means of an electric press for 3 minutes to thereby obtain a laminate.

The adhesion strength between the two layers of the laminate was measured as shown in Table 1.

TABLE 1

| Concentration of Sodium Hydroxide Aqueous Solution (wt %) | Equivalent Weight of NaOH per 28 Parts by Weight of Maleic Anhydride for Neutralization | Graft Polyolefin Particles | | | Laminate Adhesion Strength (kg/15 mm) |
|---|---|---|---|---|---|
| | | Concentration of Maleic Acid Anhydride Group* (wt %) | Content of Unreacted Maleic Anhydride (wt %) | Existence of** —COO⁻Na⁺ Group | |
| 0 | 0 | 6.1 | 0.8 | Absence | 1.7 |
| 0.4 | 0.350 | 5.3 | 0.2 | Absence | 4.5 |
| 0.6 | 0.525 | 5.2 | 0.1 | Absence | 5.4 |
| 0.8 | 0.700 | 5.2 | 0.1 | Absence | 6.0 |
| 1.0 | 0.875 | 5.2 | 0.1 | Absence | 6.0 |
| 1.2 | 1.05 | 5.2 | 0.1 | Absence | 5.9 |
| 1.4 | 1.225 | 5.1 | 0 | Absence | 5.8 |
| 1.6 | 1.40 | 4.9 | 0 | Little | — |
| 1.8 | 1.575 | 4.3 | 0 | Presence | 4.0 |
| 2.0 | 1.750 | 3.1 | 0 | Presence | — |
| 4.0 | 3.500 | 2.7 | 0 | Presence | 2.8 |

Note:
*The sum of grafted maleic anhydride group and unreacted maleic anhydride group.
**The existence of an absorption peak of 1,570 cm⁻¹ in infrared spectrum.

EXAMPLE 2

The same procedures as described in Example 1 were repeated except that the concentration of sodium hydroxide added was selected to be 0.4% by weight and the maintaining time of half an hour after the W/O emulsification was changed to such time as shown in Table 2. Thus, maleic anhydride graft polypropylene particles containing 5.1% by weight of grafted maleic anhydride were obtained.

TABLE 2

| Maintaining Time (hours) | Graft Polyolefin Particles | | |
|---|---|---|---|
| | Concentration of Maleic Anhydride Group (wt %) | Concentration of Unreacted Maleic Anhydride (wt %) | Existence of —COO⁻Na⁺ Group |
| 1/6 | 5.2 | 0.1 | Absence |
| 1 | 5.2 | 0.1 | Absence |
| 2 | 5.2 | 0.1 | Absence |
| 3 | 3.9 | 0 | Presence |
| 4 | 2.3 | 0 | Intensive Peak |

It will be understood apparently from Table 2 that the neutralized amount of the maleic anhydride group graft-polymerized with polypropylene increased as the maintaining time was prolonged over 3 hours.

EXAMPLE 3

After 0.2 part by weight of 2,5-dimethylhexane-2,5-hydroxyperoxide and 0.3 part by weight of maleic anhydride were added to 100 parts by weight of high-density polyethylene powder (MI: 0.5; sp.gr.: 0.96), the reactants were mixed by Henschel mixer. The resulting mixture was extruded by an extruder of 40 mm diameter and L/D=28 at 220° C., and cooled with water to make a pellet.

Next, 100 parts by weight of the pellet of maleic anhydride graft high-density polyethylene was added to 2,000 parts by weight of p-xylene and heated up to 90° C. to obtain a solution.

To the resultant solution, 400 parts by weight of an aqueous solution of sodium hydroxide having a concentration of 0.6% by weight was added at 110° C. for half an hour while stirring, to obtain a W/O emulsion. After the addition, the temperature was maintained at the same temperature as above for further 20 minutes.

Next, 1,600 parts by weight of sodium hydroxide aqueous solution having the same concentration was added to the resultant mixture at the same temperature for half an hour dropwise while stirring, to thereby change the phase into an O/W emulsion. The temperature was maintained at the same temperature as above for further 30 minutes, and then the mixture was cooled down to 20° C.

Next, the thus precipitated graft polyethylene particles were centrifugally separated, washed with 1,800 parts by weight of water, and dried with centrifugal separation to obtain maleic anhydride graft polyethylene particles containing 0.29% by weight of grafted maleic anhydride.

The unreacted maleic anhydride content of these particles was 0.02% by weight and the existence of —COO$^\ominus$Na$^\oplus$ groups were not found.

Press sheets each having a thickness of 0.5 mm were prepared by using the purified modified polyethylene particles and nylon 6, and the two press sheets were press-welded to each other under the condition of 40 kg/cm$^2$ and 230° C. by means of an electric press for 5 minutes to thereby obtain a laminate.

As a comparison, another laminate was obtained by using before-purified graft polyethylene particles and nylon 6.

Each adhesion strength of these laminates are shown below.

5 kg/15 mm (example according to the invention)
1.3 kg/15 mm (comparative example)

While the invention has been described in detail and with reference to specific embodiments thereof, it will be apparent to one skilled in the art that various changes and modifications can be made therein without departing from the spirit and scope thereof.

What is claimed is:

1. A process of purifying maleic anhydride graft polyolefin, comprising the steps of:

adding an aqueous solution of alkali metal hydroxide to a solution of maleic anhydride graft polyolefin containing unreacted maleic anhydride which is dissolved in an organic solvent at a temperature from 80° C. to 160° C., thereby precipitating maleic anhydride graft polyolefin particles to make a W/O emulsion;

stirring said W/O emulsion while maintaining the temperature at the same temperature as above for less than 2 hours, thereby selectively forming the alkali metal salt of unreacted maleic anhydride;

adding said aqueous solution of alkali metal hydroxide to said W/O emulsion to change said W/O emulsion into an O/W emulsion;

separating said maleic anhydride graft polyolefin particles; and washing said maleic anhydride graft polyolefin particles with water.

2. The purifying process according to claim 1, wherein said organic solvent is chlorobenzene.

3. The purifying process according to claim 1, wherein the amount of said organic solvent ranges from 100 parts by weight to 2,500 parts by weight per 100 parts by weight of said maleic anhydride graft polyolefin.

4. The purifying process according to claim 1, wherein said alkali metal hydroxide is sodium hydroxide.

5. The purifying process according to claim 1, wherein the concentration of said aqueous solution of said alkali metal hydroxide ranges from 0.4 to 1.8% by weight.

6. The purifying process according to claim 1, wherein the equivalent weight amount of the hydroxide ions in said aqueous alkali metal hydroxide solution ranges from 0.35 to 1.6 equivalent per one equivalent of carboxyl groups in both the graft polyolefin and the unreacted maleic anhydride in order to neutralize the carboxyl groups in the unreacted maleic anhydride.

7. The purifying process according to claim 1, wherein said W/O emulsion is stirred at a temperature of from 80° to 160° C.

8. The purifying process according to claim 1, wherein the amount of the maleic anhydride in the graft polyolefin ranges from 0.01 to 15% by weight.

9. The purifying process according to claim 1, wherein said organic solvent is an aromatic hydrocarbon, an aliphatic hydrocarbon or a halogenated hydrocarbon which has essentially no affinity for water.

* * * * *